Feb. 11, 1964
H. C. MORROW
3,120,916
SELF-CENTERING ROLL
Filed May 14, 1962
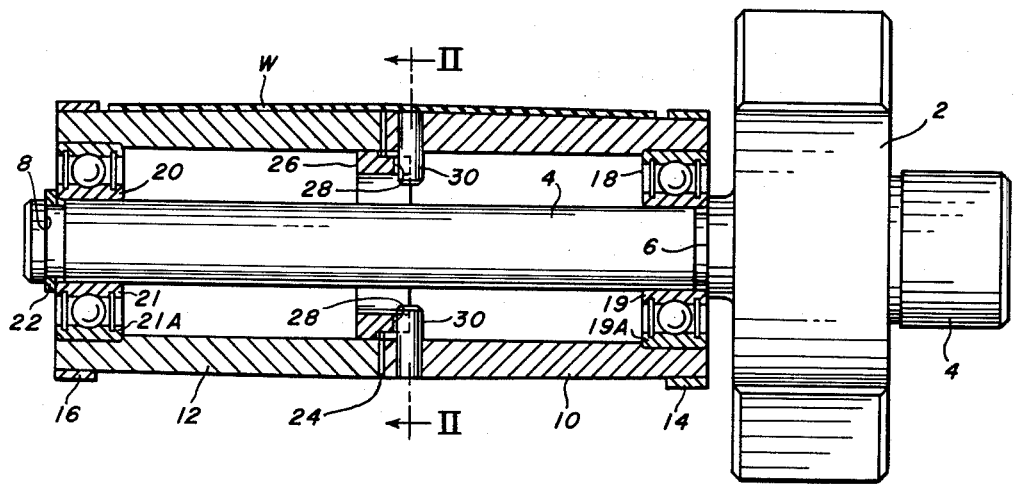
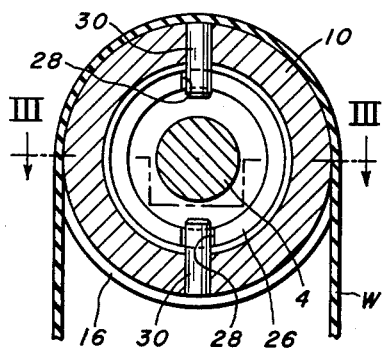
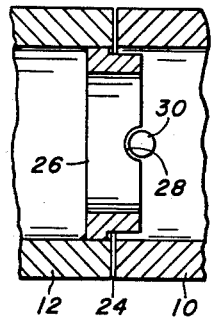
INVENTOR.
HARRY C. MORROW
By Donald G. Dalton
Attorney 3,120,916
SELF-CENTERING ROLL
Harry C. Morrow, Pittsburgh, Pa., assignor to United States Steel Corporation, a corporation of New Jersey
Filed May 14, 1962, Ser. No. 194,338
9 Claims. (Cl. 226—192)

This invention relates to a self-centering roll and more particularly to such a roll for handling webs of material which must be processed with a minimum of tension, such as paper and plastics. Rolls of this general type are shown in Lorig Patent No. 2,593,158 dated April 15, 1952, and also in Lorig Patent No. 2,817,940 dated December 31, 1957. The rolls shown therein have a rotatable shaft which is supported at both ends and normally require considerable tension.

It is an object of the present invention to provide a roll in which deflection of the roll shells is provided by ball bearings.

Another object is to provide a roll in which the amount of deflection of the roll shells may be varied.

Still another object is to provide such a roll which will center with minimum tension applied thereto.

These and other objects will be more apparent after referring to the following specification and attached drawings, in which:

FIGURE 1 is a sectional view of the roll of my invention;

FIGURE 2 is a view taken on the line II—II of FIGURE 1; and

FIGURE 3 is a view taken on the line III—III of FIGURE 2.

Referring more particularly to the drawings reference numeral 2 indicates a stanchion for supporting one end of a roll shaft 4. The shaft 4 has an abutment 6 at the end adjacent the stanchion 2 and a groove 8 at the end remote from the stanchion 2. Shells 10 and 12 surround the shaft 4 and form a web supporting surface. Preferably the shells 10 and 12 are tapered from their adjacent ends to a smaller diameter toward their remote ends. However, large diameter portions 14 and 16, shown in the form of rings, may be provided on the remote end of each shell. A ball bearing 18 has its inner race 19 mounted on the shaft 4 abutting the shoulder 6. The outer race 19A of bearing 18 supports the roll shell 10. A ball bearing 20 has its inner race 21 supported on the opposite end of the shaft 4. The outer race 21A of bearing 20 supports the shell 12. A retainer ring 22 is received in the groove 8 and as shown is of less width than the width of the groove 8. Thus, the bearing 20 is positioned with respect to bearing 18 so as to provide a gap 24 between the adjacent ends of shells 10 and 12.

In order to drive the shells 10 and 12 at the same angular velocity an inner ring 26 is secured within the shell 12 with a portion thereof extending into shell 10. Two diametrically opposed grooves 28 are provided in the inner ring 26 for receiving driving pins 30 attached to the shell 10.

In operation, a web W is passed around the shells 10 and 12 and under minimum tension will cause the shells 10 and 12 to deflect around the self aligning ball bearings 18 and 20 with the amount of deflection being limited by the controlled width of the gap 24. The width of the gap 24 may be varied by changing the width of the retaining ring 22. When the shells 10 and 12 are deflected they will act in essentially the same manner as the rolls of the above mentioned Lorig patents in order to center the web W on the roll. The raised diameter portions 14 and 16 are spaced apart a distance greater than the width of the web W and act as guides to bring the web W toward the center of the roll if the web is considerably off center as it approaches the roll. However, in most instances the raised portions 14 and 16 will not be necessary. It is desired to have the roll shells 10 and 12 tapered a very slight amount to insure that they will not drop below the horizontal level at their adjacent ends under maximum web tension. While the shaft 4 may be supported at both ends it will be seen that the web W can be more easily threaded through a processing or web handling line when the shaft is supported at one end only.

While one embodiment of my invention has been shown and described it will be apparent that other adaptations and modifications may be made without departing from the scope of the following claims.

I claim:

1. A self-centering roll for conveying an object comprising a shaft, means for non-rotatably supporting said shaft, two shells surrounding said shaft to form an object supporting surface tapering from the adjacent ends of the shells to a smaller diameter toward the remote ends of the shells, a ball bearing mounted on one end of said shaft for supporting that end of the first of said shells remote from the second of said shells, means for preventing movement of said bearing away from the second of said shells, a ball bearing mounted on the other end of said shaft for supporting that end of the second of said shells remote from the first of said shells, a retaining ring supported on said shaft for limiting movement of said last named ball bearing away from said first named ball bearing, an inner ring secured to one of said shells with a portion thereof extending into the other of said shells, said inner ring having a pair of diametrically opposed grooves therein, a pair of radial pins attached to the other of said shells one received in each of said grooves, and a raised diameter portion on each of said shells on the end remote from the other shell.

2. A self centering roll for conveying an object comprising a non-rotatable shaft, means for non-rotatably supporting said shaft, two shells surrounding said shaft to form an object supporting surface, a ball bearing mounted on one end of said shaft for supporting that end of the first of said shells remote from the second of said shells, means for preventing movement of said bearing away from the second of said shells, a ball bearing mounted on the other end of said shaft for supporting that end of the second of said shells remote from the first of said shells, means for limiting movement of said last named ball bearing away from said first named ball bearing, and means for causing said shells to rotate at the same angular velocity, said last named means including an inner ring secured to one of said shells with a portion thereof extending into the other of said shells, said inner ring having a pair of diametrically opposed grooves therein, and a pair of radial pins attached to the other of said shells one received in each of said grooves.

3. A self centering roll according to claim 2 including a raised diameter portion on each of said shells on the end remote from the other shell.

4. A self centering roll for conveying an object comprising a shaft, means for non-rotatably supporting said shaft, two shells surrounding said shaft to form an object supporting surface tapering from the adjacent ends of the shells to a smaller diameter toward the remote ends of the shells, a ball bearing mounted on one end of said shaft for supporting that end of the first of said shells remote from the second of said shells, means for preventing movement of said bearing away from the second of said shells, a ball bearing mounted on the other end of said shaft for supporting that end of the second of said shells remote from the first of said shells, means for limiting movement of said last named ball bearing away from said first named ball bearing, and means for causing said shells to rotate at the same angular velocity, said last named means including an inner ring secured to one of said shells with a portion thereof extending into the other of said shells, said inner ring having a pair of diametrically opposed grooves therein, and a pair of radial pins attached to the other of said shells one received in each of said grooves.

5. A self centering roll according to claim 4 including a raised diameter portion on each of said shells on the end remote from the other shell.

6. A self centering roll for conveying an object comprising a non-rotatable shaft, means for non-rotatably supporting said shaft, two shells surrounding said shaft to form an object supporting surface, an abutment on said shaft adjacent one end thereof, a ball bearing mounted on said shaft having one side bearing against said abutment and its other side toward the other end of said shaft, said bearing extending radially outwardly and supporting that end of the first of said shells remote from the second of said shells so that movement of the first of said shells toward said abutment is limited, a ball bearing mounted on the other end of said shaft for supporting that end of the second of said shells remote from the first of said shells and limiting movement of said last named shell away from said first named shell, a retaining ring supported on said shaft adjacent said last named bearing on the side remote from the first named bearing, said retaining ring limiting movement of said last named ball bearing away from said first named ball bearing, and means for causing said shells to rotate at the same angular velocity.

7. A self centering roll for conveying an object comprising a non-rotatable shaft, means for non-rotatably supporting said shaft, two shells surrounding said shaft to form an object supporting surface, an abutment on said shaft adjacent one end thereof, a ball bearing mounted on said shaft having one side bearing against said abutment and its other side toward the other end of said shaft, said bearing extending outwardly and supporting that end of the first of said shells remote from the second of said shells so that movement of the first of said shells toward said abutment is limited, said shaft having a peripheral groove therein adjacent the other end of said shaft, said shaft being of substantially uniform diameter between said abutment and said groove, a ball bearing mounted on the other end of said shaft for supporting that end of the second of said shells remote from the first of said shells, and limiting movement of said last named shell away from said first named shell, a retaining ring supported in said groove for limiting movement of said last named ball bearing away from said first named ball bearing, and means for causing said shells to rotate at the same angular velocity.

8. A self centering roll for conveying an object comprising a shaft, means for non-rotatably supporting one end of said shaft only, two shells surrounding said shaft to form an object supporting surface, an abutment on said shaft adjacent said supporting means, a ball bearing mounted on said shaft having one side bearing against said abutment and its other side toward the unsupported end of said shaft, said bearing extending radially outwardly and supporting that end of the first of said shells remote from the second of said shells, said bearing limiting movement of said first shell toward said supporting means, a ball bearing mounted on the other end of said shaft for supporting that end of the second of said shells remote from the first of said shells and limiting movement of said last named shell away from said first named shell, a retaining ring supported on said shaft adjacent said last named bearing on the side remote from the first named bearing, said retaining ring limiting movement of said last named ball bearing away from said first named ball bearing, and means for causing said shells to rotate at the same angular velocity.

9. A self centering roll for conveying an object comprising a shaft, means for non-rotatably supporting one end of said shaft only, two shells surrounding said shaft to form an object supporting surface, an abutment on said shaft adjacent said supporting means, a ball bearing mounted on said shaft having one side bearing against said abutment and its other side toward the unsupported end of said shaft, said bearing extending radially outwardly and supporting that end of the first of said shells remote from the second of said shells, said shaft having a peripheral groove therein adjacent the other end of said shaft, said shaft being of substantially uniform diameter between said abutment and said groove, said bearing limiting movement of said first shell toward said supporting means, a ball bearing mounted on the other end of said shaft for supporting that end of the second of said shells remote from the first of said shells and limiting movement of said last named shell away from said first named shell, a retaining ring supported on said shaft adjacent said last named bearing on the side remote from the first named bearing, said retaining ring being supported in said groove for limiting movement of said last named ball bearing away from said first named ball bearing, and means for causing said shells to rotate at the same angular velocity.

References Cited in the file of this patent

UNITED STATES PATENTS

| | | |
|---|---|---|
| 1,432,832 | Brockett | Oct. 24, 1922 |
| 2,593,158 | Lorig | Apr. 15, 1952 |
| 2,701,430 | Lorig | Feb. 8, 1955 |
| 3,069,058 | Haff | Dec. 18, 1962 |